(12) United States Patent
Wright et al.

(10) Patent No.: US 7,048,979 B2
(45) Date of Patent: *May 23, 2006

(54) ARTICLES PREPARED FROM HIGH MOLECULAR WEIGHT/LOW COUPLED BLOCK COPOLYMERS

(75) Inventors: Kathryn J. Wright, Katy, TX (US); Willem C. Vonk, Amsterdam (NL); Cornelis Martinus van Dijk, Amsterdam (NL)

(73) Assignee: KRATON Polymers U.S. LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/860,192

(22) Filed: Jun. 3, 2004

(65) Prior Publication Data

US 2005/0272866 A1 Dec. 8, 2005

(51) Int. Cl.
*C08L 51/08* (2006.01)

(52) U.S. Cl. .................. 428/36.9; 428/523; 525/89
(58) Field of Classification Search .......... 525/89; 428/36.9, 523
See application file for complete search history.

(56) References Cited

U.S. PATENT DOCUMENTS

| | | | |
|---|---|---|---|
| 3,149,182 A | 9/1964 | Porter | |
| 4,107,131 A | 8/1978 | Gergen et al. | |
| 4,755,545 A | 7/1988 | Lalwani | |
| 5,182,319 A | 1/1993 | Mitchell | |
| 5,693,718 A * | 12/1997 | De Groot et al. | ........... 525/314 |
| 5,777,043 A * | 7/1998 | Shafer et al. | ............... 525/339 |
| 6,150,439 A | 11/2000 | Keiichi et al. | |
| 6,534,593 B1 * | 3/2003 | Komatsuzaki et al. | ........ 525/89 |

FOREIGN PATENT DOCUMENTS

| | | |
|---|---|---|
| DE | 2 318 121 | 4/1998 |
| DE | 203 10 484 | 11/2003 |
| EP | 1 348 737 | 10/2003 |
| EP | 04101527.2 | 4/2004 |
| EP | 1 586 606 A1 | 10/2005 |
| WO | 02/26889 | 4/2002 |

OTHER PUBLICATIONS

McKay K.W. et al: "The Influence of Styrene-Butadiene Diblock Copolymer on Styrene-Butadiene-Styrene Triblock Copolymer Viscoelastic Properties and Product Performance" Journal of Applied Polymer Science, John Wiley and Sons Inc., New York, vol. 56, No. 8, May 23, 1995, pp. 947-958.

* cited by examiner

*Primary Examiner*—Jeffrey Mullis

(57) ABSTRACT

The present invention relates to articles prepared from novel anionic block copolymers of mono vinyl aromatics and conjugated dienes, and to blends of such block copolymers with other polymers. The block copolymer may be blended with at least one other polymer selected from the group consisting of olefin polymers, styrene polymers, amorphous resins and engineering thermoplastic resins.

25 Claims, No Drawings

ARTICLES PREPARED FROM HIGH MOLECULAR WEIGHT/LOW COUPLED BLOCK COPOLYMERS

BACKGROUND OF THE INVENTION

1. Field of the Invention

This invention relates to articles prepared from novel anionic block copolymers of aromatic vinyl compounds and conjugated dienes, and to blends of such block copolymers with other polymers. The invention also relates to formed articles and methods for forming articles from such novel block copolymers.

2. Background of the Art

The preparation of block copolymers of mono alkenyl arenes and conjugated dienes is well known. One of the first patents on linear ABA block copolymers made with styrene and butadiene is U.S. Pat. No. 3,149,182. Over the last forty plus years a large number of new styrene diene polymers have been developed. Such polymers include linear polymers, radial polymers, asymmetric polymers, hydrogenated polymers, functionalized polymers and the like. In most cases the polymer was developed to meet an important customer need that is not currently being met. This has been a very dynamic process, and has resulted in enormous growth for new styrene/diene block copolymers and new uses to meet consumer demands.

In EP Patent Application Serial Number 04101527.2 filed on Apr. 14, 2004 in the EPO, a novel polymer is disclosed that found particular utility as an asphalt binder. This resulted in a reduction in drain-down, while maintaining proccessability at all stages of blending, mixing, laying and compaction, using standard available equipment. This novel polymer is actually a mixture of polymers, and comprises 5 to 70% by weight of a linear and/or radial styrene/diene block copolymer having a relatively high molecular weight, and 95 to 30% by weight of a styrene/diene diblock copolymer having lower molecular weight. Methods for making such polymers are described in detail in the above-mentioned patent application.

What has now been found is that blends or compounds of these novel block copolymer mixtures with processing oils and other polymers have surprising property advantages, and show promising utility in a variety of end-use applications, including injection molding, extruded goods and polymer modification.

SUMMARY OF THE INVENTION

In one aspect of the present invention we have discovered that a novel composition comprising a block copolymer composition having (i) a high molecular weight linear and/or radial multiblock copolymer component along with (ii) a lower molecular weight diblock component, and including another component, has superior properties for many applications. We have also discovered that these compositions can be used in various forming processes, and that they also have a number of advantages in processing.

Accordingly, the broad aspect of the present invention is an article comprising the novel block copolymer composition and at least one other component selected from the group consisting of olefin polymers, styrene polymers, tackifying resins, polymer extending oils and engineering thermoplastic resins, wherein said block copolymer composition has a first block copolymer selected from linear styrenic block copolymers (SBC1), radial styrenic block copolymers (SBC2) and mixtures thereof, and an elastomer component (El) comprising a styrenic diblock component.

In another aspect of the present invention we have shown that the article can be formed in a wide variety of processes, including injection molding, compression molding, over molding, dipping, extrusion, roto molding, slush molding, blow molding, polymer modification, fiber spinning, cast film making, blown film making and foaming.

In yet another aspect of the present invention, the article can be processed into the form of a film, sheet, multi layer laminate, coating, band, strip, profile, molding, foam, tape, fabric, thread, filament, ribbon, fiber, or plurality of fibers.

As for advantages of the present invention, it has long been desired to have a polymer with high molecular weight in conjunction with easy proccessability. High molecular weight polystyrene blocks are often necessary to achieve good high temperature performance particularly in automotive applications. In order to maintain a constant polystyrene content, an increase in the polystyrene block molecular weights forces an increase in the total polymer molecular weight. This leads to very high viscosities and often intractable flow. In order to achieve the high molecular weights desired, at acceptable processing conditions, a new polymer has been discovered. The use of a high molecular weight SBS polymer in combination with a relatively high molecular weight SB diblock allows for ease of processing while maintaining useful properties.

In addition, SBR has found wide use throughout the industry but has a limited service temperature range due to the lack of phase separation resulting in only one glass transition temperature. Copolymers of the present invention behave similarly to SBR in terms of their processing characteristics, namely with respect to mastication of the butadiene under the presence of heat and shear. Upon application of a heat history during processing, the butadiene elastomer degrades to high and low molecular weight species allowing for proccessability while maintaining useful properties. In addition the phase separation resulting from the block copolymer structure provides two separate glass transition temperatures which increase the service temperature range when compared to a traditional unvulculanized SBR.

Finally, the copolymers of the present invention can be compounded with other components not adversely affecting the copolymer properties. Exemplary materials that could be used as additional components would include, without limitation, pigments, antioxidants, stabilizers, surfactants, waxes, and flow promoters. The polymers of the present invention are useful in a wide variety of applications including, for example, molded and extruded goods such as toys, grips, handles, shoe soles, tubing, sporting goods, sealants, gaskets, and oil gels. The compositions also find use as rubber toughening agents for polyolefins, polystyrene, polyurethane, polyester, polycarbonate and epoxy resins. The polymers of the present invention are also useful in alloys and blends, and as compatibilizers for a variety of polymers and other materials.

DETAILED DESCRIPTION OF THE PREFERRED EMBODIMENTS

The key component of the present invention is the novel block copolymer composition. The novel block copolymer composition comprises a high molecular weight styrenic block copolymer combined with a low molecular weight elastomer. Preferably, the styrenic block copolymer has a molecular weight in the range of 250,000 to 800,000 if said copolymer is a linear polymer, or in the range of 500,000 to 1,500,000 if said copolymer is a branched or star-shaped polymer. Most preferably the styrenic block copolymer constituents are selected from the group consisting of $A\text{-}B\text{-}A\text{-}(B)_p$ or $(A\text{-}B)_2$ wherein A represents the polymer block substantially made of an aromatic vinyl compound, typically a polystyrene block; B a represents the polymer block substantially made of a conjugated diene, typically a polybutadiene block, p is 0 or 1 and X is the residue of a coupling agent.

These preferred styrenic block copolymer constituents are selected from a larger group of styrenic block copolymers, that all may be used in the compositions of the present invention, consisting of those of the formulae $(B)_p\text{-}(A\text{-}B)_2X$; or $(B)_p\text{-}A(B\text{-}A)_n\text{-}(B)_p$, (linear SBC1)

$((B)_p(A\text{-}B)_n)_mX$ (radial SBC2)

wherein A, B, p and X have the meaning set out above, n is an integer greater than or equal to 1, and m is an integer greater than 2.

The expression "substantially" as used herein means that sufficient vinyl aromatic compound is used, for instance at least 50% by weight, to provide a hard block A having a glass transition temperature of greater than 25° C., whereas in terms of the block B the expression "substantially" means that sufficient conjugated diene is used, for instance at least 70% by weight, to provide an elastomer block having a glass transition temperature below 25° C.

The content of the vinyl aromatic compound in the styrenic block copolymer is from 10 to 50% by weight, preferably from 15 to 40% by weight.

The vinyl aromatic compound may be selected from compounds having 8 to 18 carbon atoms per molecule. For instance, some representative examples thereof include: styrene; 1-vinylnaphthalene; 3-methylstyrene; 3,5-diethyl-styrene; 4-propylstyrene; 2,4,6-trimethylstyrene; 4-dodecyl-styrene; 3-methyl,5-n-hexylstyrene; 4-phenylstyrene; 2-ethyl,4-benzylstyrene; 2,3,4,5-tetraethylstyrene; 3-ethyl-1-vinylnaphthalene; alpha-methylstyrene, and the like. Preferred examples comprise 3-methylstyrene, styrene and mixtures thereof, styrene being most preferred. Compounds that may be copolymerized and form part of the A block(s) may be selected from the conjugated dienes hereafter, and other anionically polymerizable, vinyl monomers, such as vinylcyclohexane, t-butyl-methacrylate and the like. Most preferably each polymer block A is a polystyrene block.

Block B is preferably made from butadiene, isoprene or mixtures thereof. Conjugated dienes that can be used, preferably having from 4 to 12 carbon atoms per molecule, further include 2,3-dimethyl-1,3-butadiene, piperylene, 3-butyl-1,3-octadiene, phenyl-1,3-butadiene, and the like. Said block(s) may also comprise other monomers, such as the vinyl aromatic compounds mentioned herein above. Most preferably block B is a polybutadiene block.

As is known, butadiene (and other conjugated dienes) may polymerize in 1,4-addition manner and/or 1,2-addition manner. The latter results in pending vinyl groups. It is known in the art to use styrenic block copolymers having relatively high vinyl content, e.g. up to 70% and higher (based on the conjugated diene), e.g. by polymerizing the conjugated diene monomer in the presence of a polar cosolvent and/or at a relatively cool polymerization temperature. In producing the polymer block (B) under ordinary conditions a vinyl content of less than 25% is obtained. Both high vinyl and ordinary styrenic block copolymers may be used.

Styrenic block copolymer and elastomer may be used in relative amounts of 15 to 70% by weight (SBC1 and/or SBC2) and 85 to 30% by weight (El), respectively, but preferably in relative amounts 20 to 50% by weight (SBC 1 and/or SBC2) and 80 to 50% by weight (El). Most preferably, the relative amounts are selected within the aforementioned range on the basis of some scouting experiments, to compensate for the effect of the molecular weights of these components and the effect of the blend.

Depending on their method of preparation these SBC's are known to comprise diblock copolymers of formula A-B in various amounts. Indeed, in coupling reactions, the diblock copolymers of formula A-B have the same molecular weight of the arms in the coupled polymer. The co-produced diblock copolymer of formula A-B may be the low molecular weight elastomer (El) component of the polymer composition, provided it has a molecular weight in the range of from 10,000 to 250,000 and is present in an amount in the range of 85 to 30% by weight basis the polymer composition. This is the preferred embodiment. On the other hand, elastomer (El) may be a separate elastomer, selected from the elastomers mentioned herein before. Elastomer (El) may also be a diblock copolymer produced independent of the preparation of the styrenic block copolymer (A) (SBC1 or SBC2).

The polymer composition that has been found to be most suitable for the present application is a high mol weight styrene-butadiene-styrene coupled block copolymer with a large amount of di-block, with the following characteristics:
1. styrene content in the range of 25–40%, preferably about 30% by weight;
2. diblock molecular weight 180,000–215,000, preferably about 200,000;
3. diblock content 70–85%, preferably 80% by weight (which corresponds with a coupling efficiency of 15–25, preferably 20%); and
4. having a linear structure (manufactured with a difunctional coupling agent), having an apparent molecular weight (SBS) of 30,000–40,000//300,000–350,000//30,000–40,000, preferably 36000–328000–36000. With the term "apparent molecular weight", as used throughout the present specification, is meant the molecular weight, as measured by means of Gel Permeation Chromatography (GPC), relative to commercially available poly(styrene) calibration standards (according to ASTM D6474-99). One skilled in the art can readily convert "apparent" molecular weight to "real" or "true" molecular weight according to known compositionally dependent conversions. For example, a styrene/butadiene block copolymer having the structure $(S\text{-}B)_2X$ with apparent molecular weight of $(36,000\text{–}164,000)_2X$ and 30% weight bound styrene will have a real molecular weight of $(36,000\text{–}84,000)_2X$.

One of the surprising compositions of the present invention is the combination of the block copolymer with a polymer extending oil and polyolefin. Especially preferred are the types of oil that are compatible with the elastomeric segment of the block copolymer. While oils of higher aromatics content are satisfactory, those petroleum-based white oils having low volatility and less than 50% aromatic content are preferred. Typical paraffinic and naphthenic processing oils can be used to soften and extend polymers of the present invention. Polymer extending oils with an aromatic content less than 10% are preferred. The oils should additionally have low volatility, preferable having an initial boiling point above about 425° F. The amount of oil employed varies from about 0 to about 300 parts by weight per hundred parts by weight rubber, or block copolymer, preferably about 20 to about 150 parts by weight.

The block copolymers of the present invention maybe blended with a large variety of other polymers, including olefin polymers, styrene polymers, tackifying resins, and engineering thermoplastic resins.

In addition, the novel block copolymers of the present invention may be blended with conventional styrene/diene and hydrogenated styrene/diene block copolymers, such as the block copolymers available from KRATON Polymers. These block copolymers include linear S-B-S, S-I-S, S-EB- S, S-EP-S block copolymers. Also included are radial block copolymers based on styrene along with isoprene and/or butadiene and selectively hydrogenated radial block copolymers.

Olefin polymers include, for example, ethylene homopolymers, ethylene/alpha-olefin copolymers, propylene homopolymers, propylene/alpha-olefin copolymers, high impact polypropylene, butylene homopolymers, butylene/alpha olefin copolymers, and other alpha olefin copolymers or interpolymers. Representative polyolefins include, for example, but are not limited to, substantially linear ethylene polymers, homogeneously branched linear ethylene polymers, heterogeneously branched linear ethylene polymers, including linear low density polyethylene (LLDPE), ultra or very low density polyethylene (ULDPE or VLDPE), medium density polyethylene (MDPE), high density polyethylene (HDPE) and high pressure low density polyethylene (LDPE). Other polymers included hereunder are ethylene/acrylic acid (EEA) copolymers, ethylene/methacrylic acid (EMAA) ionomers, ethylene/vinyl acetate (EVA) copolymers, ethylene/vinyl alcohol (EVOH) copolymers, ethylene/cyclic olefin copolymers, polypropylene homopolymers and copolymers, propylene/styrene copolymers, ethylene/propylene copolymers, polybutylene, ethylene carbon monoxide interpolymers (for example, ethylene/carbon monoxide (ECO) copolymer, ethylene/acrylic acid/carbon monoxide terpolymer and the like.

Styrene polymers include, for example, crystal polystyrene, high impact polystyrene, medium impact polystyrene, styrene/acrylonitrile copolymers, styrene/acrylonitrile/butadiene (ABS) polymers, syndiotactic polystyrene, styrene/methyl-methacrylate copolymers and styrene/olefin copolymers. Representative styrene/olefin copolymers are substantially random ethylene/styrene copolymers, preferably containing at least 10, more preferably equal to or greater than 25 weight percent copolymerized styrene monomer. Also included are styrene-grafted polypropylene polymers, such as those offered under the tradename Interloy® polymers, originally developed by Himont, Inc. (now Basell).

For the purposes of the specification and claims, the term "engineering thermoplastic resin" encompasses the various polymers found in the classes listed in Table A below, and further defined in U.S. Pat. No. 4,107,131, the disclosure of which is hereby incorporated by reference.

TABLE A

1. Thermoplastic Polyester
2. Thermoplastic Polyurethane
3. Poly(aryl ether) and Poly(aryl sulfone)
4. Polycarbonate
5. Acetal resin
6. Polyamide
7. Halogenated thermoplastic
8. Nitrile barrier resin
9. Poly(methyl methacrylate)

Tackifying resins include polystyrene block compatible resins and midblock compatible resins. The polystyrene block compatible resin maybe selected from the group of coumarone-indene resin, polyindene resin, poly(methyl indene) resin, polystyrene resin, vinyltoluene-alphamethylstyrene resin, alphamethylstyrene resin and polyphenylene ether, in particular poly(2,6-dimethyl-1,4-phenylene ether). Such resins are e.g. sold under the trademarks "HERCURES", "ENDEX", "KRISTALEX", "NEVCHEM" and "PICCOTEX". Resins compatible with the (mid) block may be selected from the group consisting of compatible $C_5$ hydrocarbon resins, hydrogenated $C_5$ hydrocarbon resins, styrenated $C_5$ resins, $C_5/C_9$ resins, styrenated terpene resins, fully hydrogenated or partially hydrogenated $C_9$ hydrocarbon resins, rosins esters, rosins derivatives and mixtures thereof. These resins are e.g. sold under the trademarks "REGALITE", "REGALREZ", "ESCOREZ" and "ARKON".

The polymer blends of the present invention may be compounded further with other polymers, oils, fillers, reinforcements, antioxidants, stabilizers, fire retardants, antiblocking agents, lubricants and other rubber and plastic compounding ingredients without departing from the scope of this invention.

Inorganic fillers can be used for reinforcement and/or cost reduction purposes. Examples of various fillers that can be employed are found in the 1971–1972 Modem Plastics Encyclopedia, pages 240–247. Reinforcement maybe defined simply as the material that is added to a resinous matrix to improve the strength of the polymer. Most of these reinforcing materials are inorganic or organic products of high molecular weight. Various examples include glass fibers, asbestos, boron fibers, carbon and graphite fibers, whiskers, quartz and silica fibers, ceramic fibers, metal fibers, natural organic fibers, talc, and synthetic organic fibers. Especially preferred are reinforced polymer blends of the instant invention containing less than about 60 percent by weight inorganic filler, based on the total weight of the resulting reinforced blend. Coupling or sizing agents, such as various silanes, may be employed in the preparation of the reinforced blends.

Regarding the relative amounts of the various ingredients, this will depend in part upon the particular end use and on the particular block copolymer that is selected for the particular end use. Table B below shows some notional compositions expressed in percent weight, which are included in the present invention. For the "Polymer" amount, a portion may include conventional styrene block copolymers:

TABLE B

| Applications, Compositions and Ranges | | |
|---|---|---|
| Application | Ingredients | Composition % w. |
| Films, Molding, Alloys | Polymer | 1–99% |
|  | Ethylene copolymers: EVA, Ethylene/styrene | 99–1% |
| Injection Molded articles | Polymer | 25–100% |
|  | Polyolefin | 0–50% |
|  | PS | 0–50% |
|  | Oil | 0–50% |

TABLE B-continued

Applications, Compositions and Ranges

| Application | Ingredients | Composition % w. |
|---|---|---|
| Injection molded/extrusion | Polymer | 55–90% |
| | PPO | 0–50% |
| | PS | 0–50% |
| | Engineering Plastic | 0–50% |
| | Filler | 0–60% |
| | Oil | 0–60% |
| Cap Seals | Polymer | 25–90% |
| | Oil and/or Tackifying Resin | 0–50% |
| | PP | 0–50% |
| | Filler | 0–25% |
| | Lubricant | 0 to 3% |
| Engineering Thermoplastic toughening | Polymer or Maleated Polymer | 5–30% |
| | Engineering thermoplastic, e.g. Nylon 6,6, TPU | 70–95% |
| Dipped Goods | Polymer | 60–100% |
| | Plasticizer, oil | 0–40% |
| Polymer Modification | Polymer | 5–95% |
| | ABS, PS, HIPS, PE | 95–5% |

The polymer of the present invention maybe used in a large number of applications, either as a neat polymer or in a compound. The following various end uses and/or processes are meant to be illustrative, and not limiting to the present invention:

Polymer modification applications

Injection molding of toys, medical devices

Extruding films, tubing, profiles

Over molding applications for personal care, grips, soft touch applications, for automotive parts, such as airbags, steering wheels, etc Dipped goods, such as gloves Thermoset applications, such as in sheet molding compounds or bulk molding compounds for trays Roto molding for toys and other articles Slush molding of automotive skins Thermal spraying for coatings Blown film for medical devices Blow molding for automotive/industrial parts

EXAMPLES

The following examples are provided to illustrate the present invention. The examples are not intended to limit the scope of the present invention and they should not be so interpreted. Amounts are in parts by weight per hundred parts by weight rubber unless otherwise indicated.

Example 1

In Example 1, two batches of a block copolymer of the present invention were prepared. In the first step, the styrene block (A) was polymerized with a sec-butyl initiator in a reactor, resulting in a polystyrene block having a molecular weight of about 36,000 daltons. Then 1,3-butadiene was added to prepare the butadiene block (B). The diblock copolymer was then coupled with an Epon 826 epoxy coupling agent. The polymers had the following characteristics:

| | Polymer # 419-011 | Polymer # 420-011 |
|---|---|---|
| Percent Styrene (wt) | 30.2% | 29.9% |
| A–B mol weight | 196,900 | 203,100 |
| (A–B)$_2$ mol weight | 400,200 | 408,900 |
| Coupling Efficiency | 21.4% | 20.3% |

The polymer used in the Examples was #420-111 and is designated Polymer #1. Accordingly, Polymer #1 is a mixture of an (S-B)$_2$ linear polymer and an S-B diblock copolymer, where the S block is a polystyrene block having about 36,000 dalton molecular weight and the B block is a polybutadiene block having about 167,000 dalton molecular weight. The polymer composition comprises about 20 parts by weight of the linear polymer and about 80 parts by weight of the diblock, corresponding to a 20% coupling efficiency.

Example 2

In this example, a conventional radial styrenic block copolymer of the structure (S-B)$_n$X coupled with dimethyl adipate and having on average between about 3 and 4 arms is compared with a block copolymer of the present invention. In the conventional block copolymer the S block has a mol weight of about 21,000 and the GPC peak molecular weight of the polymer is about 425,000, with a styrene content of 30% by weight. The block copolymer of the present invention was Polymer #1 from Example 1. The effect of the diblock on neat polymer properties can be seen in the table below. Tensile properties on solution cast films show that, as expected, the diblock significantly reduces the tensile strength of the polymer.

| Polymer | Conventional Radial Copolymer | High Mol Wt/ Low Coupled Copolymer |
|---|---|---|
| 50% Modulus (psi) | 286 | 260 |
| 100% Modulus (psi) | 295 | 265 |
| 300% Modulus (psi) | 425 | 310 |

-continued

| Polymer | Conventional Radial Copolymer | High Mol Wt/ Low Coupled Copolymer |
|---|---|---|
| Tensile Strength (psi) | 4000 | 740 |
| Elongation (%) | 1180 | 1625 |

When the polymer is subjected to various heat histories via twin screw compounding and injection molding, the results are surprising. The table below shows physical and mechanical data for such a compound in comparison with the same conventional radial copolymer. After processing, the tensile strength of the compound containing the polymer of the present invention is actually higher than that containing the conventional polymer. Compression set is also slightly improved (5% absolute reduction), while elongation and flexural modulus are slightly increased. In addition melt flow increases substantially

| Formulation | 1 | 2 |
|---|---|---|
| Conventional Radial Copolymer | 22 | |
| High Mol Wt/ Low Coupled Copolymer | | 22 |
| Ergon L2000 | 22 | 22 |
| PP 5E63 | 62 | 62 |
| BaSO4 | 105 | 105 |
| Crodamide OR | 0.5 | 0.5 |
| Ethanox 330 | 0.2 | 0.2 |
| Zinc Stearate | 1.7 | 1.7 |
| Hardness, 10s (A) | 91 | 93 |
| Tensile Properties MD | | |
| Tensile Strength (PSI) | 1175 | 1265 |
| Elongation (%) | 70 | 115 |
| Tear strength (PLI) | 305 | 295 |
| Compression set (%) 70° C. / 22 hours | 87 | 82 |
| Flexural Modulus (ksi) | 63.4 | 75.3 |
| Melt flow (g/10 min) 235° C. / 5 kg | 56 | 80 |

The formulation ingredients include Ergon L2000, a naphthenic oil; PP5E63, a 12 melt flow polypropylene homopolymer; barium sulfate; Crodamide OR, an oleamide; Ethanox 330, an antioxidant; and zinc stearate.

What is claimed is:

1. An injection molded, dipped, rotational molded, slush molded, fiber spun, blow molded, extruded or over molded article comprising a block copolymer composition and at least one other component selected from the group consisting of olefin polymers, styrene polymers, tackifying resins, polymer extending oils, and engineering thermoplastic resins, wherein said block copolymer composition comprises:
   a. from 20 to 50% by weight, based on the total weight of the block copolymer composition, of a first block copolymer selected from linear styrenic block copolymers (SBC1), radial styrenic block copolymers (SBC2) and mixtures thereof, wherein:
      i. said linear block copolymer is of the formulae:

$(A-B)_2X$ wherein A represents a polystyrene block; B represents a polymer block of a conjugated diene, n is an integer greater than or equal to 1, and X is the residue of a coupling agent or multifunctional monomer and has an apparent molecular weight greater than 250,000 and;
      ii. said radial styrenic block copolymer is of the formulae:

$((AB)_n)_mX$ wherein A represents a polystyrene block; B represents a polymer block of a conjugated diene, n is an integer greater than or equal to 1, m is an integer greater than 2, and X is the residue of a coupling agent or multifunctional monomer each of said polymer arms has an average apparent molecular weight greater than 125,000 and
   b. from 80 to 50% by weight based on the total weight of the block copolymer composition, of an elastomer (El) having an apparent molecular weight of 120,000 to 250,000, comprising a styrenic diblock copolymer having one polymer block substantially made of an aromatic vinyl compound and one polymer block substantially made of a conjugated diene compound.

2. The article according to claim 1 wherein in said block copolymer composition said aromatic vinyl compound is styrene and said conjugated diene compound is selected from the group consisting of isoprene and butadiene.

3. The article according to claim 2 wherein said conjugated diene is butadiene, and wherein about 10 to about 80 mol percent of the condensed butadiene units in block B have 1, 2-configuration.

4. The article according to claim 3 wherein the first block copolymer has an apparent molecular weight of 250,000 to 800,000 if said copolymer is a linear polymer, or 500,000 to 1,500,000 if said copolymer is a radial polymer.

5. The article according to claim 3 wherein said first block copolymer is an $(A-B)_nX$ block copolymer where n is an integer from 2 to about 8, X is the coupling agent residue, each A block has an apparent molecular weight of about 30,000 to about 40,000, each B block has an apparent molecular weight of about 150,000 to about 170,000, and the total styrene content in the block copolymer composition is between about 15 weight percent and about 40 weight percent.

6. The article according to claim 1 comprising 100 parts by weight of said block copolymer composition and about 5 to about 300 parts by weight of a polymer extending oil.

7. The article according to claim 1 comprising 100 parts by weight of said block copolymer composition and about 5 to about 300 parts by weight of an olefin polymer selected from the group consisting of but not limited to ethylene homopolymers, ethylene/alpha olefin copolymers, propylene homopolymers, propylene/alpha olefin copolymers, high impact polypropylene, and ethylene/vinyl acetate copolymers.

8. The article according to claim 7 also comprising about 5 to about 50 parts by weight of a tackifying resin.

9. The article according to claim 1 comprising 100 parts by weight of said block copolymer composition and about 5 to about 200 parts by weight of a styrene polymer selected from the group consisting of crystal polystyrene, high impact polystyrene, syndiotactic polystyrene, styrene/methyl-methacrylate copolymer and acrylonitrile/butadiene/styrene terpolymer.

10. The article according to claim 5 comprising 100 parts by weight of said block copolymer composition and about 5 to about 200 parts by weight of a styrene polymer selected from the group consisting of crystal polystyrene, high impact polystyrene, syndiotactic polystyrene, styrene/methyl-methacrylate copolymer and acrylonitrile/butadiene/styrene terpolymer.

11. The article according to claim 5 comprising 5 to 40 percent weight, based on the total weight of the block copolymer composition, of said block copolymer composition and 60 to 95 percent weight, based on the total weight of the block copolymer composition, of a styrene polymer comprising either a homopolymer or a copolymer.

12. The article according to claim 1 wherein said styrene polymer is crystal polystyrene or high impact polystyrene.

13. The article according to claim 11 wherein said styrene polymer is a styrene/methyl-methacrylate copolymer.

14. The article according to claim 11 wherein said styrene polymer is an acrylonitrile/butadiene/styrene terpolymer.

15. The article according to claim 9 also comprising about 5 to about 50 parts by weight of a tackifying resin.

16. A cap seal formed from a formulated composition comprising a block copolymer composition and at least one component selected from the group consisting of fillers, reinforcements, polymer extending oils, tackifying resins, lubricants and polyolefins, wherein said block copolymer composition comprises:
   a. from 20 to 50% by weight, based on the total weight of the block copolymer composition, of a first block copolymer selected from linear styrenic block copolymers (SBC1), radial styrenic block copolymers (SBC2) and mixtures thereof, wherein:
      i. said linear block copolymer is of the formulae:

$(A-B)_2X$ wherein A represents a polystyrene block; B represents a polymer block of a conjugated diene, n is an integer greater than or equal to 1, and X is the residue of a coupling agent or multifunctional monomer and has an apparent molecular weight greater than 250,000 and;
      ii. said radial styrenic block copolymer is of the formulae:

$((A-B)_n)_mX$ wherein A represents a polystyrene block; B represents a polymer block of a conjugated diene, n is an integer greater than or equal to 1, m is an integer greater than 2, and X is the residue of a coupling agent or multifunctional monomer and each of said polymer arms has an average apparent molecular weight greater than 125,000 and from 80 to 50% by weight based on the total weight of the block copolymer composition, of an elastomer (El) having an apparent molecular weight of 120,000 to 250,000, comprising a styrenic diblock copolymer having one polymer block substantially made of an aromatic vinyl compound and one polymer block substantially made of a conjugated diene compound.

17. The article according to claim 1 wherein the article is in the form of a film, sheet, coating, band, strip, profile, molding, foam, tape, fabric, thread, filament, ribbon, fiber, plurality of fibers or, fibrous web.

18. The article according to claim 1 comprising about 5 to 20 percent weight, based on the total weight of the block copolymer composition, of said block copolymer composition and about 80 to about 95 percent weight, based on the total weight of the block copolymer composition, of an engineering thermoplastic resin.

19. The article according to claim 18 wherein said engineering thermoplastic resin is selected from the group consisting of thermoplastic polyester, thermoplastic polyurethane, poly(arylether), poly(aryl sulfone), polycarbonate, acrylic resins, acetal resin, polyamide, halogenated thermoplastic, and nitrile barrier resin.

20. The article according to claim 1 further comprising one or more additional block copolymers selected from SBS and SIS copolymers.

21. The article according to claim 1 in the form of a film.

22. The article according to claim 1 in the form of a fiber.

23. The article according to claim 1 in the form of an elongated tube.

24. The article according to claim 1 in the form of a sheet.

25. The article according to claim 6 which further comprises from 5 to 200 parts by weight of an olefin polymer or a styrene polymer.

* * * * *

UNITED STATES PATENT AND TRADEMARK OFFICE
CERTIFICATE OF CORRECTION

PATENT NO.        : 7,048,979 B2                                           Page 1 of 1
APPLICATION NO. : 10/860192
DATED             : May 23, 2006
INVENTOR(S)       : Kathryn J. Wright, Wilem C. Vonk and Cornelis Martinus van Dijk It is certified that error appears in the above-identified patent and that said Letters Patent is hereby corrected as shown below:

Column 11, line 10 reads as follow:

12. The article according to claim 1 wherein said styrene polymer is crystal polystyrene or high impact polystrene.

However, it should read as follow:

12. The article according to claim 11 wherein said styrene polymer is crystal polystyrene or high impact polystyrene.

Signed and Sealed this

Twenty-second Day of August, 2006

JON W. DUDAS
*Director of the United States Patent and Trademark Office*